(12) United States Patent
Saito

(10) Patent No.: US 11,538,174 B2
(45) Date of Patent: Dec. 27, 2022

(54) BEHAVIOR RECOGNITION METHOD AND INFORMATION PROCESSING APPARATUS

(71) Applicant: FUJITSU LIMITED, Kawasaki (JP)

(72) Inventor: Takahiro Saito, Asaka (JP)

(73) Assignee: FUJITSU LIMITED, Kawasaki (JP)

( * ) Notice: Subject to any disclaimer, the term of this patent is extended or adjusted under 35 U.S.C. 154(b) by 142 days.

(21) Appl. No.: 17/209,454

(22) Filed: Mar. 23, 2021

(65) Prior Publication Data

US 2021/0398297 A1    Dec. 23, 2021

(30) Foreign Application Priority Data

Jun. 23, 2020 (JP) .............................. JP2020-107485

(51) Int. Cl.
*G06T 7/246* (2017.01)
*G06V 10/46* (2022.01)
(Continued)

(52) U.S. Cl.
CPC ............ *G06T 7/251* (2017.01); *G06V 10/462* (2022.01); *G06V 20/52* (2022.01); *G06V 40/23* (2022.01)

(58) Field of Classification Search
CPC ....... G06T 7/251; G06T 13/40; G06T 19/003; G06T 2200/24; G06T 2219/2021;
(Continued)

(56) References Cited

U.S. PATENT DOCUMENTS 10,854,104 B2 * 12/2020 Mettler May .......... A61B 5/486
2005/0157908 A1    7/2005 Matsugu et al.
(Continued)

FOREIGN PATENT DOCUMENTS

CN    113065515 A  *  7/2021
JP    2005-202653 A    7/2005
(Continued)

OTHER PUBLICATIONS

Model-Free Detection, Encoding, Retrieval, and Visualization of Human Poses From Kinect Data—2015 (Year: 2015).*
(Continued)

*Primary Examiner* — Nizar N Sivji
(74) *Attorney, Agent, or Firm* — WHDA, LLP

(57) ABSTRACT

A behavior recognition method includes extracting, by a computer, skeleton information including a plurality of joint positions for each frame of an image, calculating a first set of motion feature amounts from the skeleton information, calculating a plot position by plotting the first set of motion feature amounts on a feature amount space defined by a second set of motion feature amounts, the plot position being a position where the first set of motion feature amounts is plotted on the feature amount space, the feature amount space having a plurality of mapping areas in which respective ranges corresponding to predetermined higher-level behaviors to be recognized are mapped, and expanding, when a degree of divergence from a minimum distance to other distances among distances between the plot position and each of the plurality of mapping areas satisfies a predetermined criterion, a mapping area at the minimum distance from the plot position.

15 Claims, 15 Drawing Sheets

(51) Int. Cl.
*G06V 20/52* (2022.01)
*G06V 40/20* (2022.01)

(58) Field of Classification Search
CPC . G06T 2207/10016; G06T 7/246; G06T 7/73; G06V 10/462; G06V 20/52; G06V 40/23; G06V 40/20; G06K 9/6256
See application file for complete search history.

(56) References Cited

U.S. PATENT DOCUMENTS

| | | | | |
|---|---|---|---|---|
| 2012/0143358 | A1* | 6/2012 | Adams | A63F 13/814 700/92 |
| 2012/0214594 | A1* | 8/2012 | Kirovski | A63F 13/213 463/36 |
| 2014/0240231 | A1* | 8/2014 | Minnen | G06V 40/20 345/158 |
| 2014/0267611 | A1* | 9/2014 | Kennett | G06V 40/20 348/46 |
| 2015/0036879 | A1* | 2/2015 | Shiozaki | G06T 7/73 382/103 |
| 2017/0189784 | A1* | 7/2017 | Sasaki | G09B 19/003 |
| 2019/0012530 | A1* | 1/2019 | Tomono | G06T 7/251 |
| 2019/0187780 | A1* | 6/2019 | Hayashida | G06F 3/011 |
| 2020/0250408 | A1* | 8/2020 | Takeichi | A61B 5/1123 |

FOREIGN PATENT DOCUMENTS

| | | | | |
|---|---|---|---|---|
| JP | 2018-147153 A | 9/2018 | | |
| WO | WO-2018070414 A1 * | 4/2018 | | A61B 5/1122 |

OTHER PUBLICATIONS

Behavior Recognition Using Multiple Depth Cameras Based on a Time-Variant Skeleton Vector Projection—2017 (Year: 2017).*
Action Recognition Using Rate-Invariant Analysis of Skeletal Shape Trajectories—2016 (Year: 2016).*

* cited by examiner

FIG. 2

| BASIC MOTION ID | MOTION NAME | MOTION TYPE | MOTION FEATURE AMOUNT AND DETERMINATION CONDITION ||
| --- | --- | --- | --- | --- |
| | | | POSTURE FEATURE AMOUNT | TIME CHANGE INFORMATION |
| BA0001 | WALK | CONTINUOUS | WHOLE BODY POSTURE="walk" | MOVING SPEED≦4.0 |
| BA0002 | RUN | CONTINUOUS | WHOLE BODY POSTURE="run" | MOVING SPEED>4.0 |
| BA0003 | SQUAT | INSTANTANEOUS | WHOLE BODY POSTURE="squat" | STATE CHANGE |
| BA0004 | SIT | INSTANTANEOUS | WHOLE BODY POSTURE="sit" | STATE CHANGE |
| ... | ... | ... | ... | ... |
| BA0034 | STRETCH THE RIGHT HAND FORWARD | INSTANTANEOUS | BENDING ANGLE OF THE RIGHT ELBOW>150 RELATIVE POSITION OF THE RIGHT WRIST="front" | STATE CHANGE |
| BA0035 | STRETCH THE LEFT HAND FORWARD | INSTANTANEOUS | BENDING ANGLE OF THE LEFT ELBOW>150 RELATIVE POSITION OF THE LEFT WRIST="front" | STATE CHANGE |
| ... | ... | ... | ... | ... |
| BA0060 | MOVE THE UPPER HALF OF BODY | CONTINUOUS | — | UPPER HALF OF BODY POSTURE CHANGE AMOUNT |
| BA0061 | FLUTTER THE LEGS | CONTINUOUS | — | LOWER HALF OF BODY POSTURE CHANGE AMOUNT |
| BA0063 | LOOK AROUND | CONTINUOUS | — | HEAD DIRECTION CHANGE AMOUNT |
| BA0064 | WANDER AROUND | CONTINUOUS | — | MOVING DIRECTION CHANGE AMOUNT |
| ... | ... | ... | ... | ... |

FIG. 8

| BEHAVIOR TYPE | AREA DEFINITION |
|---|---|
| SORTING WORK | (0.2,0),(1.0,0),(1.0,0.05),(0.2,0.05) |
| COLLECTION WORK | (2.0,7.0),(2.8,7.0),(2.8,8.2),(2.0,8.2) |
| EMPTY TRAY INSTALLATION | (1.1,4.2),(1.8,4.2),(1.8,5.2),(1.1,5.2) |
| TRAY TRANSPORTATION | (0.01,0.81),(0.3,0.81),(0.3,1.1),(0.01,1.1) |

FIG. 9

| BEHAVIOR TYPE | AREA DEFINITION |
|---|---|
| SORTING WORK | (0.2,0),(1.0,0),(1.0,0.05),(0.2,0.05) |
| COLLECTION WORK | (2.0,7.0),(2.8,7.0),(2.8,8.2),(2.0,8.2) |
| EMPTY TRAY INSTALLATION | (1.1,4.2),(1.5,4.2),(1.6,4.1),(1.7,4.2),(1.8,4.2),(1.8,5.2),(1.1,5.2) |
| TRAY TRANSPORTATION | (0.01,0.81),(0.3,0.81),(0.3,1.1),(0.01,1.1) |

FIG. 10

| WORK ID | WORKBENCH ID | PRODUCTIVITY [QUANTITY/h] |
|---|---|---|
| ID0001 | A | 5.90 |
| ID0002 | A | 5.92 |
| ID0003 | B | 7.17 |
| ID0004 | B | 6.92 |
| ID0005 | C | 5.38 |
| ID0006 | C | 6.06 |

FIG. 14

| TIME (sec) | RECOGNITION RESULT | CORRECTION RESULT |
|---|---|---|
| 10 | EMPT | EMPT |
| 20 | EMPT | EMPT |
| 30 | SORT | SORT |
| 40 | SORT | SORT |
| 50 | SORT | SORT |
| 60 | NO OUTPUT | SORT |
| 70 | SORT | SORT |
| 80 | SORT | SORT |
| 90 | SORT | SORT |
| 100 | SORT | SORT |
| 110 | SORT | SORT |
| 120 | SORT | SORT |
| 130 | SORT | SORT |
| 140 | SORT | SORT |
| 150 | SORT | SORT |
| 160 | SORT | SORT |
| 170 | COL | SORT/COL |
| 180 | COL | COL |
| 190 | COL | COL |
| 200 | COL | COL |
| 210 | COL | COL |
| 220 | TRAN | TRAN |
| 230 | TRAN | TRAN |
| 240 | TRAN | TRAN |
| 250 | NO OUTPUT | TRAN |
| 260 | TRAN | TRAN |
| 270 | TRAN | TRAN |
| 280 | TRAN | TRAN |
| 290 | TRAN | TRAN |
| 300 | TRAN | TRAN |

BEHAVIOR RECOGNITION METHOD AND INFORMATION PROCESSING APPARATUS

CROSS-REFERENCE TO RELATED APPLICATION

This application is based upon and claims the benefit of the prior Japanese Patent Application No. 2020-107485, filed on Jun. 23, 2020, the entire contents of which are incorporated herein by reference.

FIELD

The embodiments discussed herein are related to a behavior recognition method and a behavior recognition device.

BACKGROUND

A technique for recognizing behaviors from images has been known. For example, there is a technique for recognizing a target behavior from a recognition result of basic motions of an image according to a rule in which a combination of basic motions that are constituent elements of a complicated behavior is defined.

Related techniques are disclosed in, for example, Japanese Laid-Open Patent Publication No. 2018-147153 and Japanese Laid-Open Patent Publication No. 2005-202653.

SUMMARY

According to an aspect of the embodiments, a behavior recognition method includes extracting, by a computer, skeleton information including a plurality of joint positions for each frame of an image, calculating a first set of motion feature amounts from the skeleton information, calculating a plot position by plotting the first set of motion feature amounts on a feature amount space defined by a second set of motion feature amounts, the plot position being a position where the first set of motion feature amounts is plotted on the feature amount space, the feature amount space having a plurality of mapping areas in which respective ranges corresponding to predetermined higher-level behaviors to be recognized are mapped, and executing, when a degree of divergence from a minimum distance to other distances among distances between the plot position and each of the plurality of mapping areas satisfies a predetermined criterion, an update of expanding a mapping area at the minimum distance from the plot position based on the plot position.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of determination condition data;

FIG. 8 is a diagram illustrating an example of the second rule;

FIG. 9 is a diagram illustrating another example of the second rule;

FIG. 10 is a diagram illustrating an example of analysis results;

FIG. 14 is a diagram illustrating an example of correction of the recognition result of a higher-level behavior.

DESCRIPTION OF EMBODIMENTS

There may be a large number of variations in a behavior of a recognition object. Therefore, with the above-described technique, it may be difficult to create a rule without omission of recognition of the target behavior at the time of creating the rule.

Hereinafter, embodiments of a behavior recognition method and a behavior recognition device according to the present disclosure will be described with reference to the accompanying drawings. The present disclosure is not limited to the embodiments. In addition, the embodiments may be appropriately combined with each other within the scope that does not cause any inconsistency in process contents.

First Embodiment (Example of Behavior Recognition Service)

Figure 1:
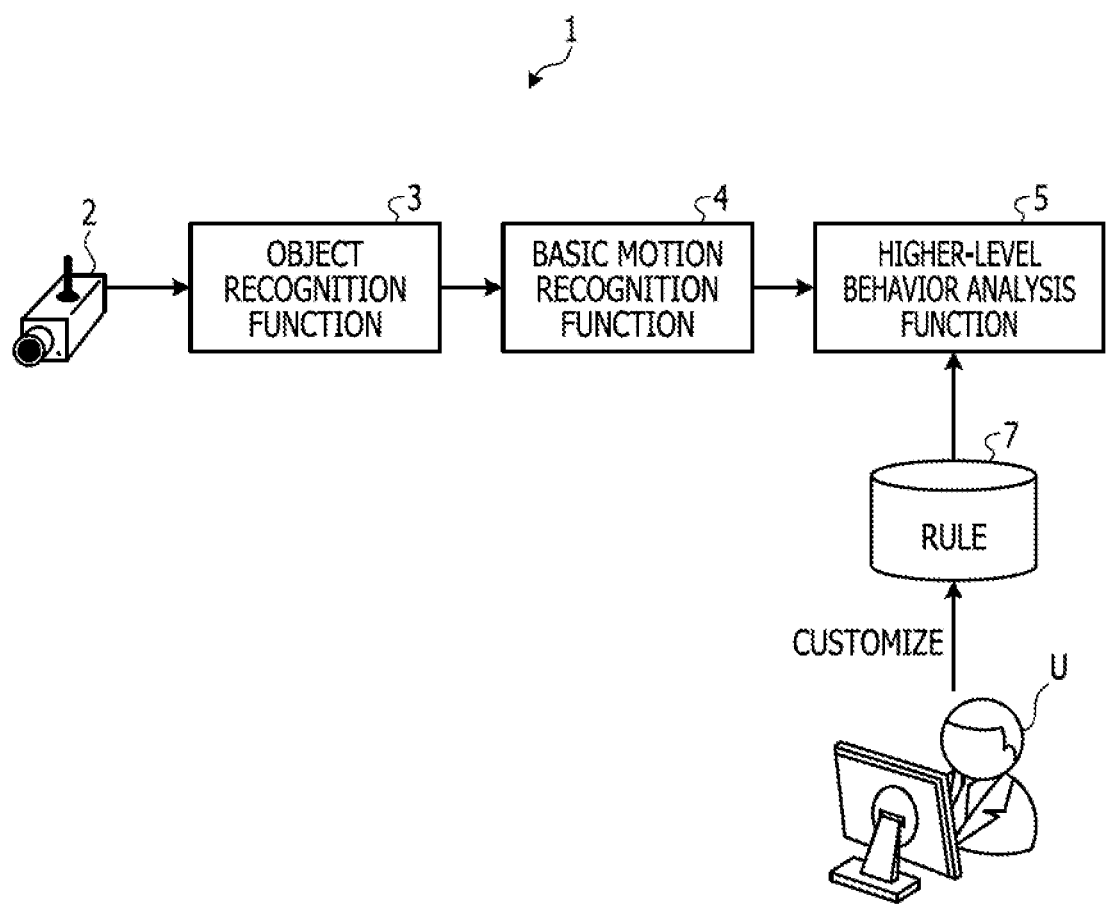
FIG. 1 is a diagram illustrating an example of a behavior recognition service according to a first embodiment.

FIG. 1 is a diagram illustrating an example of a behavior recognition service according to a first embodiment. A behavior recognition service 1 illustrated in FIG. 1 provides a service of recognizing the behavior of a subject, for example, a person, from an image of a camera 2. In such a behavior recognition service 1, just as an example, higher-level behaviors, such as work behaviors, suspicious behaviors, and purchasing behaviors, which are complicated by combining a plurality of motions, are recognition targets.

Except for the above-described behavior recognition service 1, in order to recognize the "higher-level behavior," it is necessary to prepare a large number of images including the higher-level behavior, as training data. The preparation of such a large amount of training data may be practically difficult, or even though a large amount of training data may be prepared, it takes time and effort, so that it may be difficult to introduce the large amount of training data into the field.

From the aspect of eliminating the need to prepare such a large amount of training data, the above-described behavior recognition service 1 recognizes the higher-level behavior according to a rule that defines a combination of "basic motions" performed in daily life.

As illustrated in FIG. 1, the behavior recognition service 1 may include an object recognition function 3, a basic motion recognition function 4, a higher-level behavior recognition function 5, and the like.

The object recognition function 3 is a function of recognizing an object from an image captured by the camera 2. The term "object" used herein refers to a subject of an image which is the target of behavior recognition, and may include, for example, a person to be the target of behavior recognition. In addition to the person, the object may also include things related to behavior recognition, such as tools used by persons, and furnishings, goods or equipment placed in the environment. Just as an example, the object recognition function 3 recognizes an object for each frame of the image. In addition, the object recognition function 3 extracts skeleton information including the position of each joint by performing a process called skeleton detection or posture detection (posture estimation) on the object.

The basic motion recognition function 4 is a function of recognizing the basic motion from the skeleton information of each frame. The term "basic motion" used herein may include "whole-body behavior" in which motion appears in the whole body of a person, "partial behavior" in which motion appears in a part of the human body, and the like. Among these, examples of "whole-body behavior" may include behaviors such as "walking," "running," "stopping," and the like. In addition, examples of "partial behavior" may include behaviors such as "raising the right hand," "looking down," "looking forward," and the like. These "whole-body behaviors" and "partial behaviors" are "basic motions" performed in daily life, and are simpler behaviors than "higher-level behavior." Therefore, images of the "basic motion" may easily be collected, and the "basic motions" may be highly accurately recognized by a trained model. Furthermore, the "basic motion" may include motions for objects, such as "holding an object" and "seeing an object," and motions for places, such as "a body part that enters an area of interest in an image, a so-called ROI (Region of Interest)."

The posture feature amounts, which are calculated as the feature amounts representing the posture, from the positional relationship between joints in the frame unit of the image, and the time change information thereof may be used for the recognition of such a "basic motion". Hereinafter, the "posture feature amounts" and the "time change information" may be collectively referred to as the "motion feature amounts." Here, just as an example, the feature amounts are used for the recognition of the basic motion, but the recognition of the basic motion may also be implemented by a model in which the basic motion has been learned according to a machine learning algorithm such as deep learning.

FIG. 2 is a diagram illustrating an example of determination condition data. As illustrated in FIG. 2, the determination condition data 4A defines the determination conditions on two types of motion feature amounts, i.e., the posture feature amounts and the time change information, for each "basic motion ID (identification)" which is an example of identification information for identifying the basic motion. More specifically, the determination condition data 4A adopts data in which a motion name, a motion type, and a determination condition are associated for each basic motion ID. The term "motion name" used herein refers to the name of the basic motion. Further, the term "motion type" used herein refers to a type that classifies basic motions and here, just as an example, the basic motions are classified according to which of the two types of "continuous" and "instantaneous" each motion corresponds to. For example, a motion in which the situations represented by "is doing ~" and "do ~" are the same is classified as "continuous." In addition, in a situation "is doing ~," a motion meaning the end state of the situation, for example, a result or completion of the situation, is classified as "instantaneous." Such classification enables the following discrimination of the basic motion of "instantaneous". For example, when the purpose is to recognize the state of "is squatting," it is determined whether or not the posture feature amounts satisfy the determination condition, and when recognizing the posture change of "squat," it may be used to determine whether or not the time change information satisfies the determination condition.

For example, among the basic motions illustrated in FIG. 2, the whole-body behavior is taken as an example. The basic motions in which the motion type is classified as "continuous" among the whole-body behaviors include "walk" and "run." For example, the basic motion "walk" is recognized depending on whether or not the determination condition that the position of the joint of the whole body corresponds to the posture "walk" and the moving speed of the position of the joint of the whole body is 4.0 or less is satisfied. When the moving speeds of the positions of a plurality of joints are used in this way, statistical values such as the mean value, the median value, and the mode value may be used as representative values for comparing with a threshold value. In addition, the basic motion "run" is recognized depending on whether or not the determination condition that the position of the joint of the whole body corresponds to the posture "run" and the moving speed of the position of the joint of the whole body exceeds 4.0 is satisfied.

In addition, the basic motions in which the motion type is classified as "instantaneous" among the whole-body behaviors include "squat" and "sit." Taking the basic motion "squat" as an example, when the state of "is squatting" is recognized, the determination condition on the posture feature amounts is applied. Meanwhile, when the posture change of "squat" is recognized, the determination condition on the time change information is applied. For example, the state of "is squatting" is recognized depending on whether or not the position of the joint of the whole body corresponds to the posture "squat." Meanwhile, the posture change of "squat" is determined according to the presence or absence of a state change of the posture feature amounts of the whole body. That is, the posture change of "squat" is recognized depending on whether or not the position of the joint of the whole body changes from the state where the position of the joint of the whole body does not correspond to the posture "squat" to the state where the position of the joint of the whole body corresponds to the posture "squat."

Next, among the basic motions illustrated in FIG. 2, "stretching the right hand forward" and "stretching the left hand forward" are included as examples of partial behaviors. Taking the basic motion "stretching the right hand forward" as an example, the state of "stretching the right hand forward" is recognized depending on whether or not the bending angle of the right elbow exceeds 150 degrees and the relative position of the right wrist is "front." In addition, the posture change of "stretching the right hand forward" is recognized depending on whether or not the state where the bending angle of the right elbow is 150 degrees or less or the state where the relative position of the right wrist is not "front" has changed to the state where the bending angle of the right elbow exceeds 150 degrees or the state where the relative position of the right wrist is "front."

Furthermore, among the basic motions illustrated in FIG. 2, "moving the upper half of body," "fluttering the legs," "looking around," and "wandering around" are included as examples of partial behaviors. For example, the basic motion "moving the upper half of body" is recognized according to the threshold value determination on the amount of change in the posture of the upper half of body. In addition, the basic motion "fluttering the legs" is recognized according to the threshold value determination on the amount of change in the posture of the lower half of body. In addition, the basic motion "looking around" is recognized according to the threshold value determination on the amount of change in the direction of the head. In addition, the basic motion "wandering around" is recognized according to the threshold value determination on the amount of change in the moving direction.

The higher-level behavior recognition function 5 is a function of recognizing a higher-level behavior. Just as an example, the higher-level behavior recognition function 5 collates the recognition result of the basic motion with a rule 7 and recognizes the target higher-level behavior when the rule 7 is satisfied.

Just as an example, the rule 7 may define a combination of basic motions corresponding to a higher-level behavior to be recognized, in the IF-THEN format. When the combination of basic motions is defined in the IF-THEN format, logical operations such as AND, OR, and the like may be adopted. For example, in a case where "IF basic motion A & basic motion B THEN higher-level behavior X" is described, when the basic motions A and B are recognized at the same time, the basic motions A and B are recognized as the higher-level behavior X. In addition, a chain, that is, a sequence of behaviors, may be adopted as a combination pattern of basic motions. For example, in a case where "IF basic motion A→basic motion B THEN higher-level behavior Y" is described, when the basic motion B is recognized after the basic motion A is recognized, these series of behaviors are recognized as the higher-level behavior Y.

Here, in the above-described behavior recognition service 1, the rule 7 may be set not only by system definition but also by user definition. For example, a user U may customize the rule 7 by having the user U, such as a system engineer on the business side that provides the behavior recognition service 1 or a customer of the behavior recognition service 1, edit the rule 7.

(Example of Application of Behavior Recognition Service)

Next, an example of application of the behavior recognition service 1 according to this embodiment will be described. Just as an example, a case will be described where the behavior recognition service 1 according to this embodiment is applied to the analysis on four types of works, that is, "sorting work," "collection work," "empty tray installation," and "tray transportation," which are performed at the site of a food factory, and, for example, the presentation of productivity and work time breakdown.

Figure 3:
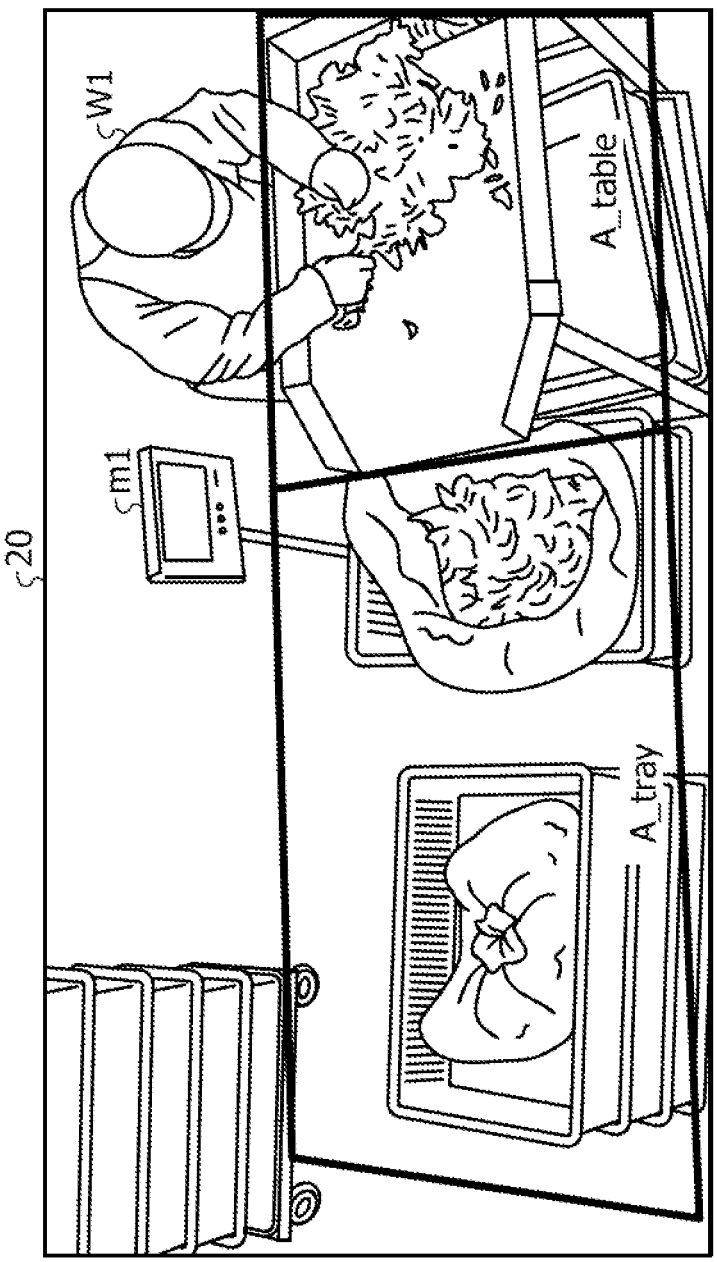
FIG. 3 is a diagram illustrating an example of an image.

FIG. 3 is a diagram illustrating an example of an image. Just as an example, FIG. 3 illustrates an image 20 of a situation where a worker W1 performs the "sorting work." Further, in FIG. 3, a ROI set in an A table where the "sorting work" is performed and a ROI set in the A tray where the "collection work" and the "empty tray installation" are performed are indicated by thick lines. As illustrated in FIG. 3, in the "sorting work," onions are sorted after removing garbage such as shells mixed with the onions on the A table on which cut onions are placed. Subsequently, in the "collection work," the sorted onions are collected in a plastic bag on an empty tray until the measured value of a weight measuring instrument ml reaches a predetermined value. Then, in the "empty tray installation," the tray for which the onions have been collected is stacked up in the longitudinal direction, and an empty tray with a plastic bag spread out is newly installed. Then, in the "tray transportation," the trays stacked up to a predetermined number of stages are transported to a predetermined collection place.

One Aspect of Problem

As described in the section BACKGROUND as well, there may be a large number of variations in a behavior as a recognition object. Therefore, it may be difficult to create a rule without omission of recognition of the target behavior at the time of creating the rule.

Figure 4:
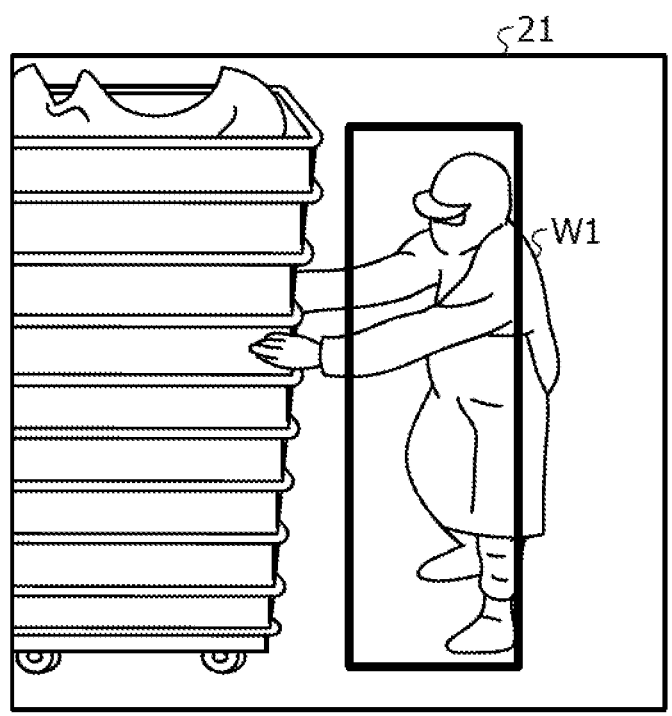
FIG. 4 is a diagram illustrating an example of an image.

From the aspect of describing the above problem, an example of recognition omission when the "tray transportation" is recognized as the target higher-level behavior will be described. FIG. 4 is a diagram illustrating an example of an image. Just as an example, FIG. 4 illustrates an image 21 of a situation where the worker W1 performs the "tray transportation." Further, in FIG. 4, an area where the worker W1 is recognized as an object, for example, a bounding box, is indicated by a thick line. For example, the IF-THEN rule illustrated in (R1) below may be described as an example of the rule for recognizing the higher-level behavior "tray transportation" from the image 21 illustrated in FIG. 4.

Higher-level behavior "tray transportation": IF basic motion "stretch both hands forward" & basic motion "walk" THEN behavior="tray transportation" ... (R1)

However, according to the above IF-THER rule, when a tray is transported in a motion pattern such as "with the elbow bent," "with one hand," or "backing," it may not be recognized as the higher-level behavior "tray transportation," and recognition omission occurs. This is because the motion pattern illustrated in the image 21 of FIG. 3 is also one aspect of "tray transportation," but it is not all of "tray transportation," and there may be a lot of variations in the motion patterns of "tray transportation." That is, there may be variations in the motion patterns of "tray transportation" such as "not stretching the elbow," "not using both hands," and "not moving forward." Since it is difficult to cover all such variations at the time of rule creation, it may be difficult to create a rule without omission of recognition.

One Aspect of Problem-Solving Approach

Therefore, in the behavior recognition service 1 according to this embodiment, an approach is adopted in which (a) the recognition omission of the higher-level behavior is detected during operation, and (b) the rule for recognizing the motion pattern of the recognition omission as the higher-level behavior is updated.

Here, the IF-THEN rule given as an example of the rule has one aspect of high readability because it is described by a combination of basic motions, but it has an aspect unsuitable for automation of (a) detection of recognition omission and (b) rule update.

That is, as a result of collating the recognition result of the basic motion with the rule, when a case that was not recognized as the higher-level behavior by a narrow margin may be regarded as the recognition omission, (a) the detection of the recognition omission may be implemented, but evaluation of such a case may be difficult with the IF-THEN rule. For example, taking the recognition omission of the higher-level behavior "tray transportation" as an example, it may be difficult to quantitatively quantify a difference between "stretching both hands" and "stretching only one hand," and the difference differs depending on the higher-level behavior to be recognized. Therefore, it may not be realistic to implement (a) the detection of recognition omission under the IF-THER rule.

In addition, since the number of rule-updating methods for recognizing one motion pattern as the higher-level behavior is not limited to one but there may be many rule-updating methods, it may be difficult to appropriately determine (b) the rule-updating method. For example, taking the recognition omission of the higher-level behavior "tray transportation" as an example, there may be an approach of suppressing the recognition omission by updating the rule of taking a logical sum of "stretching both hands" or "stretching one hand". In addition, there may be also an approach of suppressing the recognition omission by updating the rule of loosening a threshold value used for the determination condition of "stretching both hands" in recognizing the basic motion from 150 degrees. Which of either rule update or both rule updates is appropriate may not be determined only by the image 21 illustrated in FIG. 3.

In view of this point, in the behavior recognition service 1 according to this embodiment, (a) the detection of recognition omission and (b) the rule update are implemented under a feature amount space.

The above feature amount space may be created as follows. Just as an example, motion feature amounts used for recognition of each basic motion is extracted from a combination of basic motions corresponding to the higher-level behavior for each higher-level behavior to be recognized. For example, taking "tray transportation" as an example among the four types of higher-level behaviors, as represented in the above (R1), the motion feature amounts used for recognition of the basic motion "stretching both hands forward" and the basic motion "walking" are searched from the determination condition data 4A illustrated in FIG. 2. As a result, two types of motion feature amounts, "minimum value of bending angle of the left elbow and right elbow" and "moving speed", are extracted. At this time, the motion feature amount "minimum value of bending angle of the left elbow and right elbow" may be automatically extracted by a logical operation that the minimum value of "stretching both hands forward"→"right elbow bending angle" & "left elbow bending angle"→"right elbow bending angle" and "left elbow bending angle."

The motion feature amounts extracted for each higher-level behavior to be recognized in this way may be used to create the feature amount space in which all of them may be represented by vectors, but not all motion feature amounts may have to be used to create the feature amount space. For example, the motion feature amounts that distinguish a higher-level behavior from another may be also narrowed down according to a feature amount selection algorithm represented by a decision tree or linear discriminant analysis.

In the following description, just as an example, an example in which "moving speed" and "upper half of body' posture change amount" are selected as motion feature amounts that distinguish four types of higher-level behaviors: "sorting work", "collection work", "empty tray installation", and "tray transportation", from each other, will be described. Further, in the following, among the motion feature amounts used for recognition of various basic motions, the ones selected as the motion feature amounts used to define the feature amount space may be referred to as "selected feature amounts."

In the feature amount space created in this way, a range within which a higher-level behavior may be observed on a predetermined feature amount space is mapped for each of the four types of higher-level behaviors: "sorting work", "collection work", "empty tray installation", and "tray transportation".

Here, just as an example, the mapping of the observation range of the higher-level behavior may be automated by using images in which the higher-level behavior is observed, for example, reference images referred to when creating the rule. In this case, the maximum value and the minimum value of each selected feature amount calculated in a section where the higher-level behavior is observed in the reference images are extracted. For example, when the recognition of the higher-level behavior is performed every 10 seconds using the recognition result of the basic motion for the last 10 seconds, the maximum value and the minimum value of each selected feature amount calculated in the last 10 seconds from the time when the higher-level behavior is recognized are extracted. The observation range of the higher-level behavior with the maximum value and the minimum value of each selected feature amount extracted in this way as boundaries is mapped onto the feature amount space for each higher-level behavior.

In this way, by mapping the observation range of the higher-level behavior onto the feature amount space, it is possible to convert the rule for recognizing the higher-level behavior from the description in the IF-THEN format to the description of the motion feature amounts on the feature amount space. Hereinafter, the rule in which a combination of basic motions corresponding to the higher-level behavior to be recognized in the IF-THEN format is defined is distinguished from the rule in which a mapping area of the observation range of the higher-level behavior is defined on the feature amount space. From this aspect, the former may be referred to as a "first rule" and the latter may be referred to as a "second rule."

Under the situation where such a feature amount space is created, the operation of the behavior recognition service 1 according to this embodiment is started. The behavior recognition service 1 according to this embodiment plots on the feature amount space the selected feature amounts among the motion feature amounts calculated at the time of recognizing the basic motion during operation. Then, when the plot position of the selected feature amounts during operation is not included in any of mapping areas of the observation range of the higher-level behavior, the behavior recognition service 1 according to this embodiment calculates a distance between the mapping area and the plot position for each mapping area.

Here, the behavior recognition service 1 according to this embodiment determines whether or not the degree of divergence from the minimum distance to the other distance among distances calculated for each mapping area satisfies a predetermined criterion. At this time, when the degree of divergence from the minimum distance to the other distance satisfies the predetermined criterion, it is clear that the plot position of the selected feature amounts during operation is close enough to only one of the mapping areas of the observation range of the higher-level behavior and is far enough from the other mapping areas. Therefore, since the plot position of the selected feature amounts during operation is highly likely to be a case of recognition omission that was not recognized as the higher-level behavior by a narrow margin, (a) the detection of the recognition omission may be implemented. In this case, the behavior recognition service 1 according to this embodiment performs update of expanding the mapping area where a distance from the plot position is the minimum distance, based on the plot position.

Figure 5:
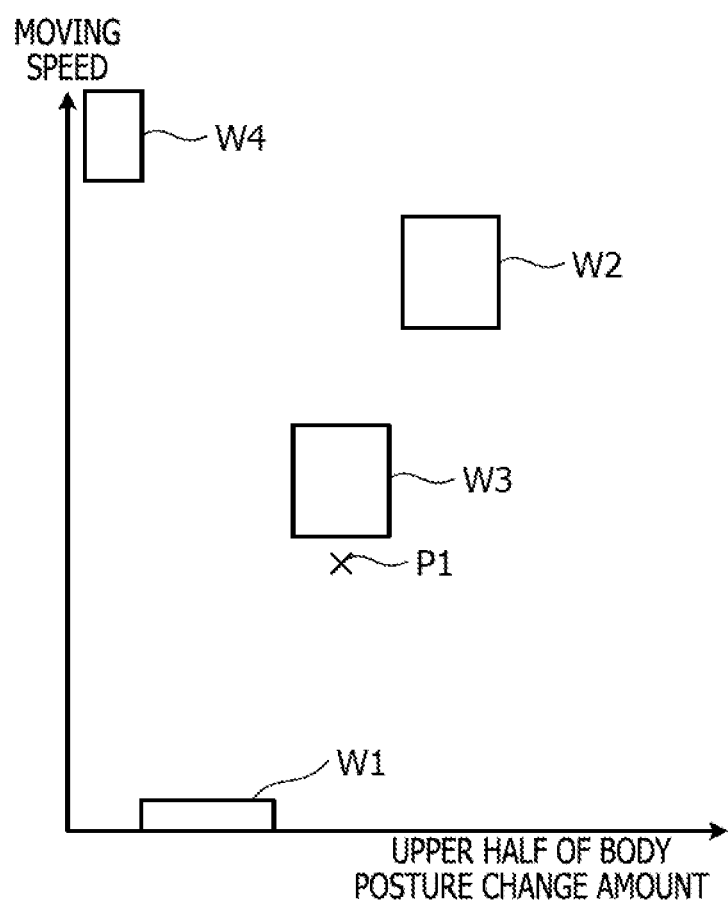
FIG. 5 is a diagram illustrating an example of a feature amount space.

FIG. 5 is a diagram illustrating an example of the feature amount space. Just as an example, FIG. 5 illustrates a two-dimensional feature amount space including a selected feature amount "moving speed" and a selected feature amount "upper half of body' posture change amount." Further, FIG. 5 illustrates mapping areas W1 to W4 to which the observation ranges of the four types of higher-level behaviors of "sorting work," "collection work," "empty tray installation," and "tray transportation" are mapped, and a plot position P1 on which selected feature amounts during operation are plotted.

As illustrated in FIG. 5, when the plot position P1 of the selected feature amounts during operation is not included in any of the mapping areas W1 to W4 of the observation range of the higher-level behavior, a distance between the plot position P1 and each of the mapping areas W1 to W4 is calculated. After the four distances are calculated in this way, as an example of determining whether or not the degree of divergence from the minimum distance to other distances satisfies a predetermined criterion, it may be determined whether or not the ratio of the minimum distance to the total of distances is less than a predetermined threshold value according to the following equation (1).

$$\text{Minimum distance}/\Sigma\text{distance}<Th1 \qquad (1)$$

Here, just as an example of distance, an example of using a Manhattan distance will be described. Further, just as an example, a case where the distance between the plot position P1 and each of the mapping areas W1 to W4 has the following values will be taken as an example. That is, it is assumed that the distance between the plot position P1 and the mapping area W1 is "5.2," and the distance between the plot position P1 and the mapping area W2 is "5.4." Further, it is assumed that the distance between the plot position P1 and the mapping area W3 is "0.1," and the distance between the plot position P1 and the mapping area W4 is "7.3."

Distance between P1 and W1=5.2
Distance between P1 and W2=5.4
Distance between P1 and W3=0.1
Distance between P1 and W4=7.3

In the above example, the distance "0.1" between the plot position P1 and the mapping area W3 is the minimum distance. Therefore, when each distance is substituted into the above equation (1), as a result of the calculation of "0.1/(5.2+5.4+0.1+7.3)," the ratio of the minimum distance to the total of distances is calculated as "0.0056." Then, it is determined whether or not the ratio "0.0056" of the minimum distance to the total of distances is less than the predetermined threshold value Th1. For example, when the threshold value Th1 is "0.01," the ratio of the minimum distance "0.0056" to the total of distances is less than the threshold value Th1 "0.01."

Based on such a determination result, it turns out that the plot position P1 of the selected feature amounts during operation is close enough to only the mapping area W3 of the observation range of the higher-level behavior "empty tray installation" and is far enough from the other mapping areas W1, W2, and W4. Therefore, it may be identified that the plot position P1 of the selected feature amounts during operation is likely to be a case of recognition omission that was not recognized as the higher-level behavior "empty tray installation" by a narrow margin. In this case, the behavior recognition service 1 according to this embodiment updates the second rule that extends the mapping area W3, which is the minimum distance from the plot position P1, based on the plot position P1.

Figure 6:
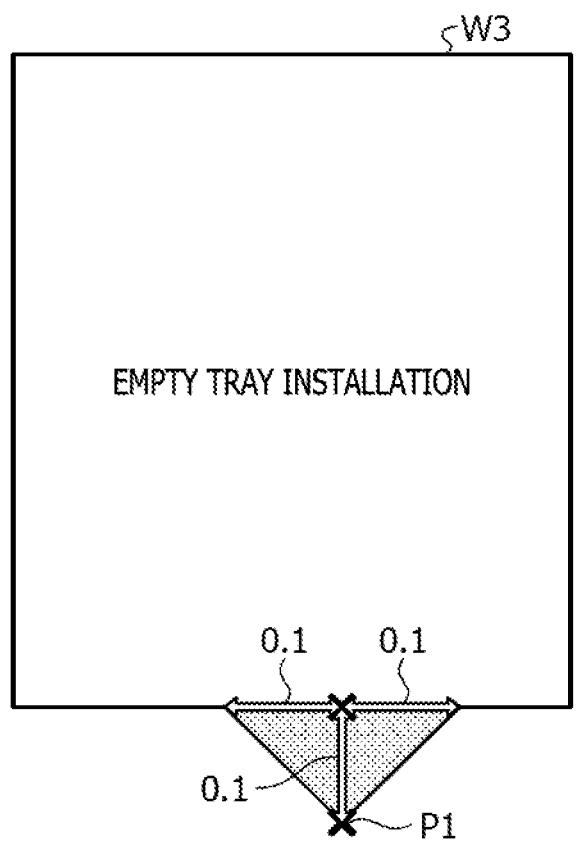
FIG. 6 is a schematic diagram illustrating an example of a method of updating a second rule.

FIG. 6 is a schematic diagram illustrating an example of a method of updating the second rule. In FIG. 6, the mapping area W3 of the observation range of the higher-level behavior "empty tray installation" is extracted from the four mapping areas mapped on the feature amount space. Further, in FIG. 6, the plot position P1 of the selected feature amounts during operation is indicated by an x mark. In this case, the mapping area of the higher-level behavior "empty tray installation" is expanded to a filling area illustrated in FIG. 6 in addition to the mapping area W3 of the observation range of the higher-level behavior "empty tray installation." That is, the corresponding triangular area within "0.1" in Manhattan distance from the plot position P1 of the selected feature amounts during operation is expanded. By such an expansion, the above (b) rule update is implemented.

As described above, when the plot position of the motion feature amounts during operation is close to any one of areas in which the observation range of the higher-level behavior is mapped to the feature amount space, the behavior recognition service 1 according to this embodiment expands the vicinity area based on the plot position. Therefore, according to the behavior recognition service 1 according to the present embodiment, it is possible to update the rule according to the operation.

(Functional Configuration of Behavior Recognition Device)

Figure 7:
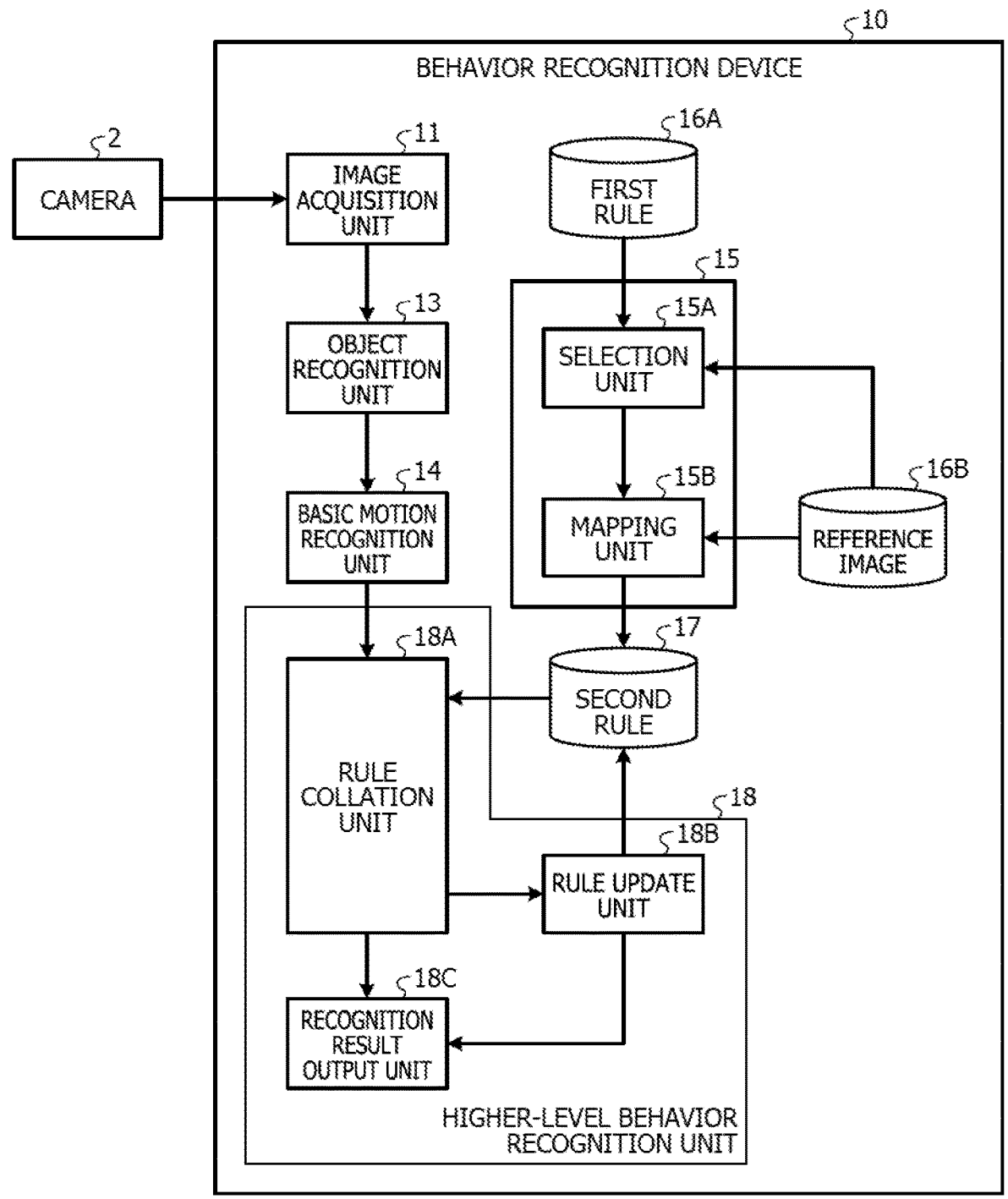
FIG. 7 is a block diagram illustrating an example of a functional configuration of a behavior recognition device according to the first embodiment.

FIG. 7 is a block diagram illustrating an example of the functional configuration of a behavior recognition device 10 according to the first embodiment. The behavior recognition device 10 illustrated in FIG. 7 corresponds to an example of a computer (information processing apparatus) that provides the above-described behavior recognition service 1.

The behavior recognition device 10 may be implemented as package software or online software by installing a behavior recognition program that realizes the above-described behavior recognition service 1 on an arbitrary computer. For example, the behavior recognition device 10 may be implemented as a SaaS (Software as a Service) type application to provide the behavior recognition service 1 as a cloud service. Without being limited thereto, the behavior recognition device 10 may be implemented as a server that provides a function corresponding to the behavior recognition service 1 on-premises.

Further, as illustrated in FIG. 7, a camera 2 corresponding to an example of an imaging device may be connected to the behavior recognition device 10. The behavior recognition device 10 and the camera 2 may be communicably connected to each other via an arbitrary network. For example, the network may be any kind of communication network such as the Internet or LAN (Local Area Network) regardless of whether it is wired or wireless. In addition, in FIGS. 1 and 7, for the convenience of descriptions, one camera 2 is connected to one behavior recognition device 10, but a plurality of cameras 2 may be connected to one behavior recognition device 10.

As illustrated in FIG. 7, the behavior recognition device 10 includes an image acquisition unit 11, an object recognition unit 13, a basic motion recognition unit 14, a rule conversion unit 15, a first rule storage unit 16A, a reference image storage unit 16B, a second rule storage unit 17, and a higher-level behavior recognition unit 18. In addition to the functional units illustrated in FIG. 7, the behavior recognition device 10 may include various functional units of known computers, such as functions corresponding to an input/output interface, a communication interface, and the like.

The functional units such as the image acquisition unit 11, the object recognition unit 13, the basic motion recognition unit 14, the rule conversion unit 15, and the higher-level behavior recognition unit 18 illustrated in FIG. 7 are virtually implemented by a hardware processor such as a CPU (Central Processing Unit), a MPU (Micro Processing Unit), and the like. That is, the processor reads out a program or the like such a behavior recognition program in which the above-described behavior recognition service 1 is packaged, in addition to an OS (Operating System), from a storage device (not illustrated) such as a HDD (Hard Disk Drive), an optical disc, a SSD (Solid State Drive), etc. Then, the processor executes the behavior recognition program to deploy on a memory such as a RAM (Random Access Memory) or the like a process corresponding to the above-mentioned functional units. As a result of executing the above-mentioned behavior recognition program in this way, the above-described functional units are virtually implemented as a process. Here, the CPU and the MPU have been illustrated as an example of the processor, but the above-described functional units may be implemented by an arbitrary processor regardless of a general-purpose type or a specialized type. In addition, all or some of the above-described functional units may be implemented by a hard-wired logic such as an ASIC (Application Specific Integrated Circuit), a FPGA (Field Programmable Gate Array), or the like.

The storage units such as the first rule storage unit 16A, the reference image storage unit 16B, and the second rule storage unit 17 may be implemented as an auxiliary storage device such as an HDD, an optical disc, or a SSD, or may be implemented by allocating a portion of a storage area of the auxiliary storage device.

The image acquisition unit 11 is a processing unit that acquires images. As an embodiment, the image acquisition unit 11 may acquire an image transferred from the camera 2 in frame units. Here, an information source from which the image acquisition unit 11 acquires the image is not limited to the camera 2 but may be any information source. For example, the image acquisition unit 11 may acquire an image from an auxiliary storage device such as a hard disk, an optical disc, or the like for storing images, or a removable medium such as a memory card, a USB (Universal Serial Bus) memory, or the like for storing images. In addition, the image acquisition unit 11 may also acquire an image from an external device other than the camera 2 via a network NW.

The object recognition unit 13 is a processing unit that recognizes an object from an image. The object recognition unit 13 may correspond to an example of an extraction unit. The object recognition unit 13 may correspond to the object recognition function 3 illustrated in FIG. 1. As an embodiment, the object recognition unit 13 recognizes an object for each frame of the image acquired by the image acquisition unit 11. Such object recognition may be implemented by a model in which the object has been learned according to a machine learning algorithm such as deep learning. Then, the object recognition function 3 extracts skeleton information including the position of each joint, for example, a two-dimensional or three-dimensional coordinate, by performing a process called skeleton detection or posture detection (posture estimation) on the object.

The basic motion recognition unit 14 is a processing unit that recognizes the basic motion from the skeleton information of each frame. Here, the basic motion recognition unit 14 may correspond to the basic motion recognition function 4 illustrated in FIG. 1, but not all of the basic motion recognition functions 4 may be provided. That is, in the behavior recognition service 1 according to this embodiment, the higher-level behavior may be recognized based on the mapping area on the feature amount space defined in the second rule without recognizing the higher-level behavior based on the IF-THEN format rule defined in the first rule. From this aspect, the basic motion recognition unit 14 may calculate the motion feature amounts for each frame of the image acquired by the image acquisition unit 11. The basic motion recognition unit 14 may correspond to an example of calculation units.

As an embodiment, the basic motion recognition unit 14 may calculate the posture feature amounts from the position of each joint in the latest frame in which an image is acquired by the image acquisition unit 11, as one of the above motion feature amounts. Further, the basic motion recognition unit 14 calculates the time change information from the time-series data of the posture feature amounts obtained by tracing back from the latest frame for a predetermined number of frames or a predetermined period. At this time, just as an example, the basic motion recognition unit 14 may calculate the motion feature amounts related to all the basic motions shown in the determination condition data 2A of FIG. 2, but the motion feature amounts related to all the basic motions may not be necessarily calculated. For example, the basic motion recognition unit 14 may calculate the feature motion amount by narrowing down the motion feature amounts related to the basic motion used for recognition of the higher-level behavior defined in the first rule or the selected feature amounts used in the definition of the feature amount space in the second rule.

The rule conversion unit 15 is a processing unit that converts the first rule into the second rule. Just as an example, the rule conversion by the rule conversion unit 15 may be executed before the operation of the behavior recognition service 1 according to this embodiment is started, but it may be executed after the operation is started. As illustrated in FIG. 7, the rule conversion unit 15 has a selection unit 15A and a mapping unit 15B.

The selection unit 15A is a processing unit that selects the motion feature amounts used for definition of the feature amount space, that is, the above-mentioned selected feature amounts. As an embodiment, the selection unit 15A refers to the first rule stored in the first rule storage unit 16A. The first rule storage unit 16A stores the first rule in which a combination of basic motions corresponding to the higher-level behaviors to be recognized, in the IF-THEN format is defined, for example, the rule 7 illustrated in FIG. 1. By referring to such a first rule storage unit 16A, the selection unit 15A extracts the motion feature amounts used for recognition of each basic motion from the combination of basic motions corresponding to the higher-level behavior for each higher-level behavior to be recognized. For example, taking "tray transportation" as an example among the four types of higher-level behaviors, as represented in the above (R1), the motion feature amounts used for recognition of the basic motion "stretching both hands forward" and the basic motion "walking" are searched from the determination condition data 4A illustrated in FIG. 2. As a result, two types of motion feature amounts: "minimum value of bending angle of the left elbow and right elbow" and "moving speed," are extracted. At this time, the motion feature amount "minimum value of bending angle of the left elbow and right elbow" may be automatically extracted by a logical operation that the minimum value of "stretching both hands forward"→"right elbow bending angle" & "left elbow bending angle"→"right elbow bending angle" and "left elbow bending angle."

All of the motion feature amounts extracted for each higher-level behavior to be recognized in this way may be used to define the feature amount space, but all types of motion feature amounts may not be necessarily used to create the feature amount space and may be narrowed down to a part.

Just as an example, the selection unit 15A selects motion feature amounts that may distinguish higher-level behaviors from each other according to a feature amount selection algorithm represented by decision tree analysis or linear discriminant analysis, from the motion feature amounts extracted for each higher-level behavior to be recognized. For example, in the case of decision tree analysis, the reference images stored in the reference image storage unit 16B is used. The reference images in which the higher-level behavior is observed for each higher-level behavior to be recognized is stored in the reference image storage unit 16B. By taking the reference images prepared for each higher-level behavior to be recognized in this way, as a root node and repeating the selection of the characteristics and threshold values of the motion feature amounts that divide nodes, a decision tree that classifies the reference images into labels of the higher-level behaviors is generated. The motion feature amounts of the characteristics selected by the division of the nodes in the branch of the decision tree may be used as the selected feature amounts.

The mapping unit 15B is a processing unit that maps the range in which the higher-level behavior may be observed for each higher-level behavior to be recognized, onto the feature amount space defined by the selected feature amounts selected by the selection unit 15A.

Here, just as an example, the mapping of the observation range of the higher-level behavior may be automated by using the reference images stored in the reference image storage unit 16B. Among such reference images, the maximum value and the minimum value of each selected feature amount calculated in the section where the higher-level behavior is observed are extracted. For example, when the recognition of the higher-level behavior is performed every 10 seconds using the recognition result of the basic motion for the last 10 seconds, the maximum value and the minimum value of each selected feature amount calculated in the last 10 seconds from the time when the higher-level behavior is recognized are extracted. The observation range of the higher-level behavior with the maximum value and the minimum value of each selected feature amount extracted in this way as boundaries is mapped onto the feature amount space for each higher-level behavior.

As a result, the first rule in which the combination of basic motions corresponding to the higher-level behavior to be recognized in the IF-THEN format is defined may be converted into the second rule in which the mapping area of the observation range of the higher-level behavior onto the feature amount space is defined. In this way, the mapping area in which the observation range of the higher-level behavior is mapped onto the feature amount space for each higher-level behavior is stored in the second rule storage unit 17, as the second rule. For example, the second rule may be defined by the coordinates of the vertices forming the boundary line of the mapping area for each mapping area.

FIG. 8 is a diagram illustrating an example of the second rule. FIG. 8 illustrates an example in which the mapping areas W1 to W4 corresponding to the observation ranges of the four types of higher-level behaviors: "sorting work," "collection work," "empty tray installation," and "tray transportation" on a two-dimensional feature amount space including the selected features "moving speed" and "upper half of body' posture change" are defined as the second rule. Further, FIG. 8 illustrates an example in which the second rule is defined by enumerating the coordinates of the vertices in the mapping areas W1 to W4 corresponding to the observation ranges of the four types of higher-level behaviors starting from the lower left vertex counterclockwise from there.

As illustrated in FIG. 8, the mapping area W1 of the higher-level behavior "sorting work" is defined by a lower left vertex (0.2, 0), a lower right vertex (1, 0), an upper right vertex (1, 0.05), and an upper left vertex (0.2, 0.05). The mapping area W2 of the higher-level behavior "collection work" is defined by a lower left vertex (2, 7), a lower right vertex (2.8, 7), an upper right vertex (2.8, 8.2), and an upper left vertex (2, 8.2). The mapping area W3 of the higher-level behavior "empty tray installation" is defined by a lower left vertex (1.1, 4.2), a lower right vertex (1.8, 4.2), an upper right vertex (1.8, 5.2), and an upper left vertex (1.1, 5.2). The mapping area W4 of the higher-level behavior "tray transportation" is defined by a lower left vertex (0.01, 0.81), a lower right vertex (0.3, 0.81), an upper right vertex (0.3, 1.1), and an upper left vertex (0.01, 1.1).

FIG. 8 illustrates an example in which the feature amount space is two-dimensional just as an example, but without being limited thereto, the number of dimensions of the feature amount space may be arbitrary. For example, when the feature amount space is three-dimensional or more, the boundary surface of the mapping area may be defined by polygons. This makes it possible to represent an arbitrary sub area in the n-dimensional feature amount space as a polygon.

Further, here, an example in which the mapping of the observation range of the higher-level behavior is performed using the reference images has been described, but without being limited thereto, the mapping of the observation range of the higher-level behavior may be performed by user setting. In this case, as a guide for user setting, a determination condition, for example, threshold values, related to the selected feature amounts among the motion feature amounts used for recognition of the basic motion defined in the rule corresponding to the higher-level behavior for each higher-level behavior to be recognized may be also searched and displayed from the determination condition data 4A of FIG. 2.

The higher-level behavior recognition unit 18 is a processing unit that recognizes higher-level behaviors. As illustrated in FIG. 7, the higher-level behavior recognition unit 18 further includes a rule collation unit 18A, a rule update unit 18B, and a recognition result output unit 18C.

The rule collation unit 18A is a processing unit that collates the selected feature amounts calculated by the basic motion recognition unit 14 with the second rule stored in the second rule storage unit 17. As an embodiment, the rule collation unit 18A determines whether or not the plot position of the selected feature amounts calculated by the basic motion recognition unit 14 is included in any of the mapping areas stored as the second rule in the second rule storage unit 17. Hereinafter, from the aspect of comparison with the second rule that may be defined before the start of operation, the selected feature amounts calculated by the basic motion recognition unit 14 may be referred to as a "selected feature amounts during operation." At this time, when the plot position of the selected feature amounts during operation is included in any of the mapping areas, it is found that there is no omission of recognition. Meanwhile, when the plot position of the selected feature amounts during operation is not included in any of the mapping areas, there remains room for recognition omissions.

The rule update unit 18B is a processing unit that updates the second rule stored in the second rule storage unit 17. As an embodiment, when the plot position of the selected feature amounts during operation is not included in any of the mapping areas, the rule update unit 18B calculates a distance between the mapping area and the plot position for each mapping area. After the four distances are calculated in this way, as an example of determining whether or not the degree of divergence from the minimum distance to other distances satisfies a predetermined criterion, it may be determined whether or not the ratio of the minimum distance to the total of distances is less than a predetermined threshold value, according to the above equation (1).

Here, when the degree of divergence from the minimum distance to the other distances satisfies a predetermined criterion, it is clear that the plot position of the selected feature amounts during operation is close enough to only one of the mapping areas of the observation range of the higher-level behavior and is far enough from the other mapping areas. In this case, since the plot position of the selected feature amounts during operation is highly likely to be a case of recognition omission that was not recognized as the high-ranking behavior by a narrow margin, it is identified as recognition omission. Meanwhile, when the degree of divergence from the minimum distance to other distances does not satisfy the predetermined criteria, it is clear that the plot position of the selected features during operation is not close enough to only one of the mapping areas of the observation range of the higher-level behavior. In this case, it may be identified that the motion pattern does not correspond to any of the higher-level behaviors and is not recognition omission.

Here, when the ratio of the minimum distance to the total of distances between the plot position and each mapping area is less than the threshold value, the rule update unit 18B performs update of expanding a mapping area in which a distance from the plot position is the minimum distance, based on the plot position.

FIG. 9 is a diagram illustrating another example of the second rule. FIG. 9 illustrates an example in which the expansion illustrated in FIG. 6 is performed for the mapping area W3 of the observation range of the higher-level behavior "empty tray installation" among the mapping areas W1 to W4 defined in the second rule illustrated in FIG. 8. As illustrated in FIG. 6, when the corresponding triangular area within "0.1" in Manhattan distance from the plot position P1 of the selected feature amounts during operation is expanded, the second rule illustrated in FIG. 8 is updated to the second rule illustrated in FIG. 9. More specifically, the coordinates of each vertex corresponding to the triangular area illustrated in FIG. 6 are added to the mapping area W3 of the higher-level behavior "empty tray installation." That is, as indicated by shading in FIG. 9, the coordinates (1.5, 4.2), (1.6, 4.1), and (1.7, 4.2) of the vertices of the triangle are added to the vertices that define the mapping area W3 of the higher-level behavior "empty tray installation."

As a result, the expansion including not only the motion pattern corresponding to the plot position P1 (1.6, 4.1) of the selected feature amounts during operation but also the variation of the motion pattern closer to the mapping area W3 than the plot position P1 in a new mapping area may be implemented. Furthermore, when the Manhattan distance is used for rule update, since the boundary surface of an area that expands the mapping area not only in the two-dimensional feature amount space but also in the three-dimensional or more feature amount space may be defined by polygons, the expandability of the description of the second rule may be enhanced.

The recognition result output unit 18C is a processing unit that outputs the recognition result of the higher-level behavior. As an aspect, when the plot position of the selected feature amounts during operation is included in any of the mapping areas, the recognition result output unit 18C outputs the label of the higher-level behavior corresponding to the mapping area including the plot position, as the recognition result. As another aspect, when the ratio of the minimum distance to the total of the distances between the plot position and each mapping area is equal to or more than the above threshold value, the recognition result output unit 18C does not output the label of any higher-level behavior. As a further aspect, when the ratio of the minimum distance to the total of the distances between the plot position and each mapping area is less than the above threshold value, the recognition result output unit 18C outputs the label of the higher-level behavior corresponding to the mapping area in which the distance from the plot position is the minimum distance, as the recognition result.

The above recognition result of the higher-level behavior may be output to any output destination. The "output destination" referred to here may be any hardware or software. For example, the recognition result of the higher-level behavior may be output to a service or function that executes any back-end process, for example, an analysis process of work efficiency, according to the recognition result of the higher-level behavior. In addition, the recognition result of the higher-level behavior may be notified to a display device, a voice output device, an information processing device, a mobile terminal device, or the like set by a user U of the behavior recognition service 1. The notification form may be arbitrary such as Web or e-mail.

(Example of Utilizing Recognition Result of Higher-Level Behavior)

Figure 11:
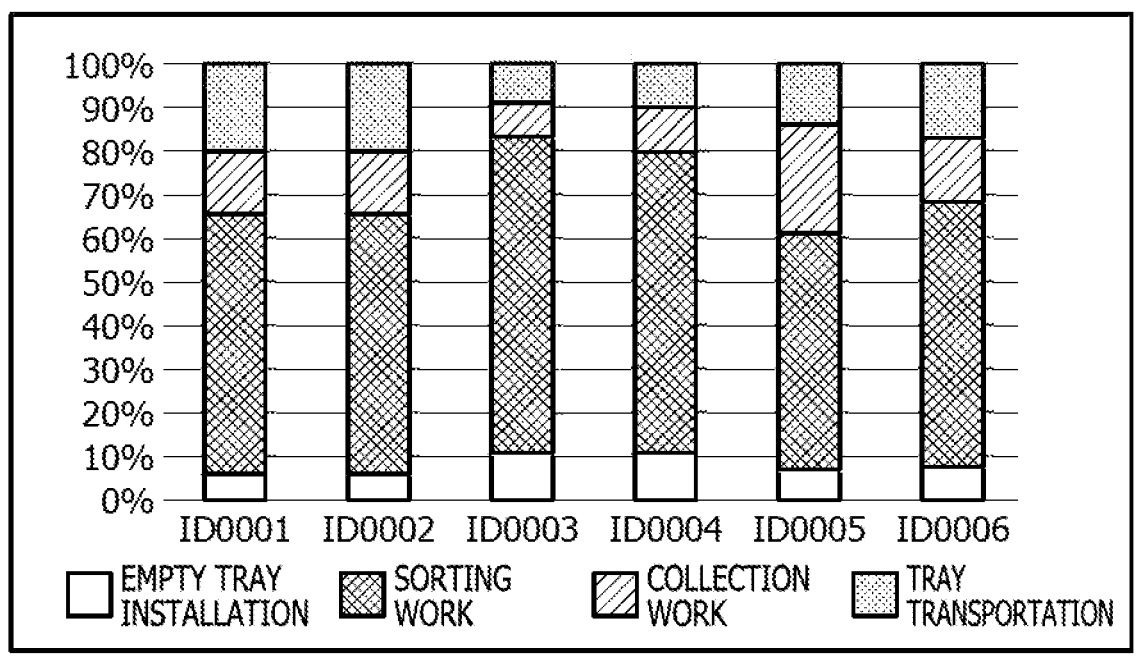
FIG. 11 is a diagram illustrating an example of analysis results.

An example of utilizing the recognition result of the higher-level behavior will be described with reference to FIGS. 10 and 11. FIGS. 10 and 11 are diagrams illustrating an example of analysis results. FIGS. 10 and 11 represent the results of analysis for each of six workers "ID0001" to "ID0006" of the recognition results of the four types of higher-level behaviors of "sorting work," "collection work," "empty tray installation," and "tray transportation" performed at the site of a food factory. FIG. 10 represents the result of analyzing the productivity, for example, the quantity of trays processed per unit time, as an example of the analysis using the recognition results of the four types of higher-level behaviors. Further, FIG. 11 represents the result of analyzing the breakdown of the work time corresponding to each higher-level behavior, as an example of the analysis using the recognition results of the four types of higher-level behaviors.

The analysis results represented in FIGS. 10 and 11 may be output to any terminal device set by the user U of the behavior recognition service 1. For example, the finding that the productivity of the workers of ID0003 and ID0004 in charge of a workbench B is high, which is caused by the low proportion of the tray transport work and the collection work, may be presented. Meanwhile, the finding that the proportion of empty tray installation is also high, which is the result of a lot of sorting work, may be presented. Further, a difference in productivity between the workers of ID0005 and ID0006 in charge of a workbench C is due to the efficiency of the collection work, and the worker ID0005 tends to take a longer time in the collection work than other workers, which may be suggested that there may be some waste during this work. Based on the analysis results represented in FIGS. 10 and 11, it is possible to present the finding that contributes to the improvement of productivity to the user U of the behavior recognition service 1 and other related parties.

(Process Flow)

Next, a process flow of the behavior recognition device 10 according to this embodiment will be described. Here, (1) a rule conversion process executed by the behavior recognition device 10 will be described, and then, (2) a rule update process will be described.

(1) Rule Conversion Process

Figure 12:
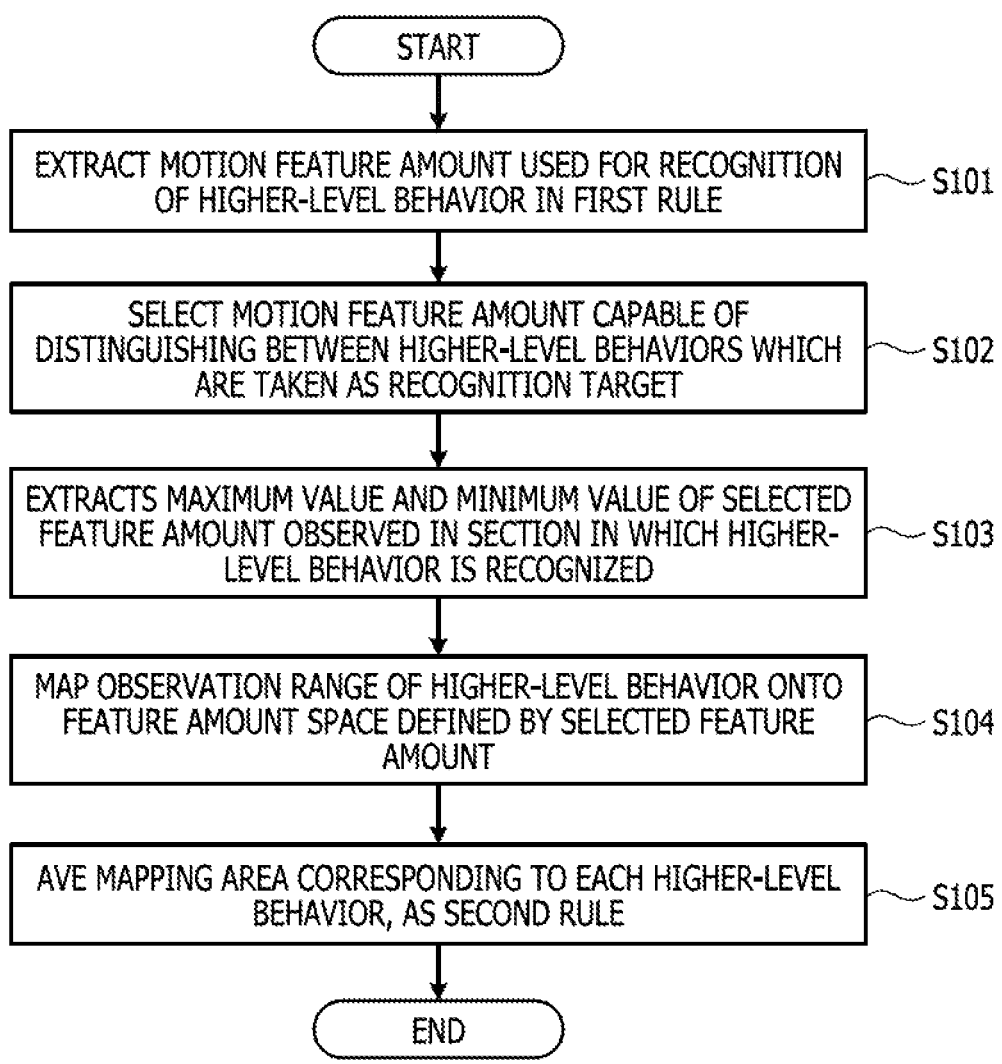
FIG. 12 is a flowchart illustrating the procedure of a rule conversion process according to the first embodiment.

FIG. 12 is a flowchart illustrating the procedure of the rule conversion process according to the first embodiment. Just as an example, this process may be executed at any timing before the operation of the behavior recognition service 1 according to this embodiment is started, for example, after the first rule and the reference images are saved, but it may also be executed after the operation is started.

As illustrated in FIG. 12, the selection unit 15A refers to the first rule stored in the first rule storage unit 16A to extract motion feature amounts used for recognition of each basic motion from a combination of basic motions corresponding to the higher-level behavior for each higher-level behavior to be recognized (step S101).

Subsequently, the selection unit 15A selects motion feature amounts capable of distinguishing higher-level behaviors from each other, among the motion feature amounts extracted for each higher-level behavior to be recognized, in the step S101 according to a feature amount selection algorithm represented by decision tree analysis or linear discriminant analysis (step S102).

Then, the mapping unit 15B extracts, for each higher-level behavior, the maximum value and the minimum value of each selected feature amount observed in the section in which the higher-level behavior is recognized of the reference images stored in the reference image storage unit 16B (step S103).

Then, the mapping unit 15B maps, for each higher-level behavior, the observation range of the higher-level behavior with the maximum value and the minimum value of each selected feature amount extracted in the step S103 as boundaries, onto the feature amount space defined by the selected feature amounts obtained in the step S102 (step S104).

Then, the mapping unit 15B saves the mapping area in which the observation range of the higher-level behavior is mapped onto the feature amount space for each higher-level behavior, in the second rule storage unit 17, as the second rule (step S105), and ends the process.

(2) Rule Update Process

Figure 13:
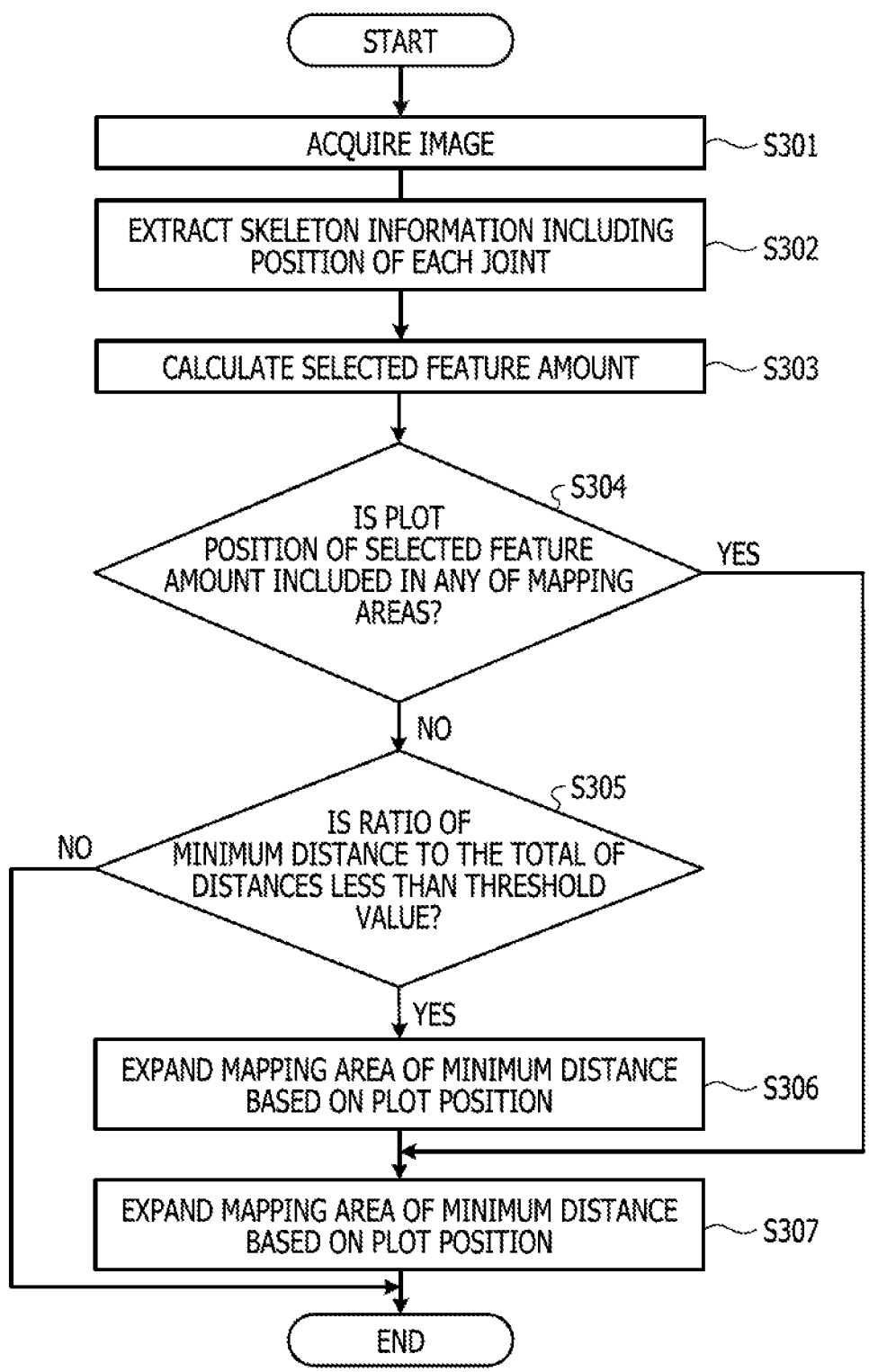
FIG. 13 is a flowchart illustrating the procedure of a rule update process according to the first embodiment.

FIG. 13 is a flowchart illustrating the procedure of the rule update process according to the first embodiment. This process may be repeatedly executed during operation at a predetermined cycle, for example, every 10 seconds. As illustrated in FIG. 13, the image acquisition unit 11 acquires an image frame from the camera 2 or the like (step S301). Then, the object recognition unit 13 extracts the skeleton information including the position of each joint by detecting the skeleton of an object recognized from the image acquired in the step S301 (step S302).

Subsequently, the basic motion recognition unit 14 calculates the selected feature amounts by calculating the posture feature amounts from the position of each joint in the latest frame acquired in the step S301, and simultaneously, calculating the time change information from the time-series data of the posture feature amounts obtained by tracing back from the latest frame for a predetermined period, for example, 10 seconds (step S303).

Then, the rule collation unit 18A determines whether or not the plot position of the selected feature amounts calculated in the step S303 is included in any of the mapping areas stored as the second rule in the second rule storage unit 17 (step S304).

Here, when it is determined that the plot position of the selected feature amounts during operation is not included in any of the mapping areas (No in step S304), the rule update unit 18B executes the following process. That is, the rule update unit 18B determines whether or not the ratio of the minimum distance to the total of the distances between the plot position and each mapping area is less than a predetermined threshold value (step S305).

At this time, when it is determined that the ratio of the minimum distance to the total of the distances between the plot position and each mapping area is less than the threshold value (Yes in step S305), the rule update unit 18B performs update of expanding a mapping area in which a distance from the plot position is the minimum distance, based on the plot position (step S306). In this case, the recognition result output unit 18C outputs the label of the higher-level behavior corresponding to the mapping area in which the distance from the plot position is the minimum distance, as the recognition result (step S307) and ends the process.

Meanwhile, when it is determined that the ratio of the minimum distance to the total of the distances between the plot position and each mapping area is not less than the threshold value (No in step S305), the label of any higher-level behavior is not output and the process is ended.

Further, when it is determined that the plot position of the selected feature amounts during operation is included in any of the mapping areas (Yes in step S304), the recognition result output unit 18C outputs the label of the higher-level behavior corresponding to a mapping area including the plot position, as the result recognition (step S307) and the process is ended.

Aspect of Effect

As described above, when the plot position of the motion feature amounts during operation is close to any one of regions in which the observation range of the higher-level behavior is mapped onto the feature amount space, the behavior recognition device 10 according to this embodiment expands the vicinity area based on the plot position. Therefore, according to the behavior recognition device 10 according to this embodiment, it is possible to implement an update of the rule according to the operation.

Second Embodiment

While the embodiment of the device according to the present disclosure has been described, the present disclosure may be implemented in various different forms other than the above-described embodiment. Therefore, another embodiment included in the present disclosure will be described below.

(Stabilizer Process)

The recognition result of the higher-level behavior may include the label "no output" that does not correspond to any of the higher-level behaviors. For example, the behavior recognition device 10 may further have a correction unit that corrects the above label "no output" according to the following rule. For example, the correction unit compares labels output at the timing before and after the label "no output." As a result, when the labels of the timings before and after are the same, it is highly possible that the higher-level behavior has been executed at the same timing corresponding to the label "no output" as the labels of the timings before and after. In this case, the correction unit corrects the label "no output" to the same label as the labels output at the timings before and after. Further, when the labels of the timings before and after are different, there is a high possibility that it is the timing when a work is switched. In this case, the correction unit corrects the label "no output" to a special label containing a predetermined proportion of labels output at the timings before and after.

FIG. 14 is a diagram illustrating a correction example of the recognition result of the higher-level behavior. FIG. 14 illustrates the recognition result of the higher-level behavior for each time elapsed from any start time to the time when the recognition result of the higher-level behavior is obtained. Further, FIG. 14 illustrates an example of the recognition result when the higher-level behavior is recognized every 10 seconds based on the selected feature amounts calculated from an image for the latest 10 seconds. Furthermore, FIG. 14 illustrates an example in which a first character of the character string indicating the label of the higher-level behavior is described as the recognition result of the higher-level behavior. For example, "Sort" refers to sorting work, "Col" refers to collection work, "Empt" refers to empty tray installation, and "Tran" refers to transportation work.

As illustrated in FIG. 14, the recognition results of the higher-level behavior include three labels "no output" at 60 sec, 170 sec, and 250 sec. For example, when the 60 sec label is corrected, a 50 sec label "Sort" and a 70 sec label "Sort" are compared. In this case, since both labels are the same, the 60 sec label is corrected from "no output" to "Sort." When the 170 sec label is corrected, a 160 sec label "Sort" and a 180 sec label "Col" are compared. In this case, both labels are different. Therefore, the 170 sec label is corrected from "no output" to a special label "Sort/Col" that evenly includes the 160 sec label "Sort" and the 180 sec label "Col." Further, when the 250 sec label is corrected, a 240 sec label "Tran" and the 260 sec label "Tran" are compared. In this case, since both labels are the same, the 250 sec label is corrected from "no output" to "Tran." By such correction, it is possible to suppress a decrease in accuracy of various analysis processes such as productivity analysis illustrated in FIG. 10 and analysis of work breakdown illustrated in FIG. 11.

In addition to being able to evenly set the proportion of labels output at the timings before and after, the proportion may also be determined based on the plot position of the selected feature amounts calculated at the timing when the label "no output" is output and the distance to the mapping area corresponding to the labels of the timings before and after. In this case, the proportion is set to be higher as the distance becomes smaller, while the proportion is set to be lower as the distance becomes larger. For example, a case where the ratio between a first distance to the mapping area corresponding to a first label output at the timing before the label "no output" and a second distance to the mapping area corresponding to a second label output at the timing after the label "no output" is 4:1 is taken as an example will be described. In this case, by exchanging the ratio between the first distance and the second distance, the proportion of the first label may be set to "0.2," and the proportion of the second label may be set to "0.8".

(Distribution and Integration)

Further, each component of each device illustrated in the figures is not necessarily required to be configured physically as illustrated. That is, specific forms of distribution or integration of the respective components is not limited to those illustrated, and all or some of the components may be configured to be functionally or physically distributed or integrated in arbitrary units according to, for example, various loads or usage conditions. For example, the image acquisition unit 11, the object recognition unit 13, the basic motion recognition unit 14, the rule conversion unit 15, or the higher-level behavior recognition unit 18 may be connected as an external device of the behavior recognition device 10 via a network. Further, other separate devices may include the image acquisition unit 11, the object recognition unit 13, the basic motion recognition unit 14, the rule conversion unit 15, and the higher-level behavior recognition unit 18, respectively, which are networked to cooperate with each other to implement the functions of the above behavior recognition device 10. Further, other separate devices may include all or some of the first rule, the reference images, and the second rule stored in the first rule storage unit 16A, the reference image storage unit 16B, and the second rule storage unit 17, respectively, which are networked to cooperate with each other to implement the functions of the above behavior recognition device 10.

(Behavior Recognition Program)

Further, the various processes described in the above embodiments may be implemented by executing a prepared program on a computer such as a personal computer or a workstation. Therefore, in the following, an example of a computer that executes a behavior recognition program having the same functions as those of the first and second embodiments will be described with reference to FIG. 15.

Figure 15:
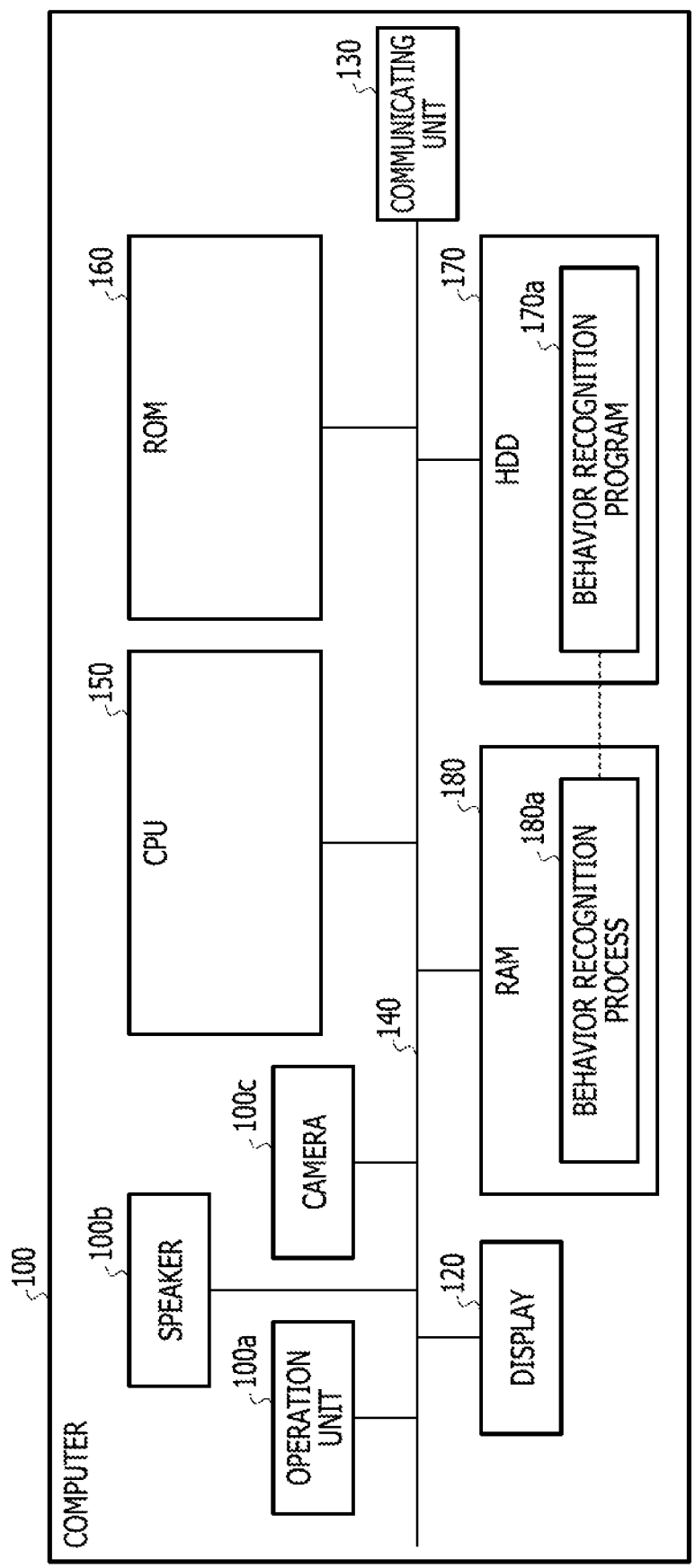
FIG. 15 is a diagram illustrating a computer hardware configuration example.

FIG. 15 is a diagram illustrating an example of a computer hardware configuration. As illustrated in FIG. 15, the computer (information processing apparatus) 100 includes an operation unit 110a, a speaker 110b, a camera 110c, a display 120, and a communication unit 130. Further, the computer 100 has a CPU 150, a ROM 160, an HDD 170, and a RAM 180. These components 110 to 180 are interconnected via a bus 140.

As illustrated in FIG. 15, the HDD 170 stores a behavior recognition program 170a to exhibit the same functions as the image acquisition unit 11, the object recognition unit 13, the basic motion recognition unit 14, the rule conversion unit 15, and the higher-level behavior recognition unit 18 illustrated in the first embodiment. The behavior recognition program 170a may be integrated or separated like the constituent elements of the image acquisition unit 11, the object recognition unit 13, the basic motion recognition unit 14, the rule conversion unit 15, and the higher-level behavior recognition unit 18 illustrated in FIG. 7. That is, not all the data illustrated in the first embodiment may be stored in the HDD 170, and the data used for processing may be stored in the HDD 170.

Under such environments, the CPU 150 reads the behavior recognition program 170a from the HDD 170 and deploys the behavior recognition program 170a on the RAM 180. As a result, the behavior recognition program 170a functions as a behavior recognition process 180a as illustrated in FIG. 15. The behavior recognition process 180a deploys various data read from the HDD 170 in an area allocated to the behavior recognition process 180a in the storage area of the RAM 180 and executes various processes using the deployed various data. For example, as an example of the processes executed by the behavior recognition process 180a, processes illustrated in FIGS. 12 and 13 are included. In addition, in the CPU 150, not all the processing units illustrated in the first embodiment need to operate, and the processing units corresponding to the processes to be executed may be implemented virtually.

Further, the behavior recognition program 170a may not necessarily be stored in the HDD 170 or the ROM 160 from the beginning. For example, the behavior recognition program 170a is stored in a "portable physical medium" such as a flexible disk (FD), a CD-ROM, a DVD disk, a magneto-optical disk, an IC card, or the like inserted in the computer 100. Then, the computer 100 may acquire and execute the behavior recognition program 170a from these portable physical media. Further, the behavior recognition program 170a may be stored in another computer or server device connected to the computer 100 via a public line, the Internet, LAN, WAN, or the like, and the computer 100 may acquire and execute the behavior recognition program 170a therefrom.

According to an aspect of the embodiments, it is possible to update a rule according to an operation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A behavior recognition method, comprising:
    extracting, by a computer, skeleton information including a plurality of joint positions for each frame of an image;
    calculating a first set of motion feature amounts from the skeleton information;
    calculating a plot position by plotting the first set of motion feature amounts on a feature amount space defined by a second set of motion feature amounts, the plot position being a position where the first set of motion feature amounts is plotted on the feature amount space, the feature amount space having a plurality of mapping areas in which respective ranges corresponding to predetermined higher-level behaviors to be recognized are mapped;
    executing, when a degree of divergence from a minimum distance to other distances among distances between the plot position and each of the plurality of mapping areas satisfies a predetermined criterion, an update of expanding a mapping area at the minimum distance from the plot position based on the plot position;
    selecting the second sets of motion feature amounts from third sets of motion feature amounts extracted from respective combinations of basic motions corresponding to the predetermined higher-level behaviors; and
    mapping respective ranges in which the predetermined higher-level behaviors are observed, on the feature amount space defined by the second sets of motion feature amounts.

2. The behavior recognition method according to claim 1, wherein
    the selecting includes selecting, as the second sets of motion feature amounts, motion feature amounts capable of distinguishing between the predetermined higher-level behaviors, from the third sets of motion feature amounts in accordance with a predetermined feature amount selection algorithm.

3. The behavior recognition method according to claim 1, wherein
    the respective ranges are set based on maximum values and minimum values of the second sets of motion feature amounts obtained in a section where the predetermined higher-level behaviors are observed on the feature amount space in predetermined reference images.

4. The behavior recognition method according to claim 1, wherein
    each of the mapping areas is defined by a coordinate of a vertex forming a boundary line of each of the mapping areas.

5. The behavior recognition method according to claim 4, wherein
    the executing includes expanding an area defined by the coordinate of the vertex located at the minimum distance in Manhattan distance from the plot position.

6. A non-transitory computer-readable recording medium having stored therein a program that causes a computer to execute a process, the process comprising:
    extracting skeleton information including a plurality of joint positions for each frame of an image;
    calculating a first set of motion feature amounts from the skeleton information;
    calculating a plot position by plotting the first set of motion feature amounts on a feature amount space defined by a second set of motion feature amounts, the plot position being a position where the first set of motion feature amounts is plotted on the feature amount space, the feature amount space having a plurality of mapping areas in which respective ranges corresponding to predetermined higher-level behaviors to be recognized are mapped;
    executing, when a degree of divergence from a minimum distance to other distances among distances between the plot position and each of the plurality of mapping areas satisfies a predetermined criterion, an update of expanding a mapping area at the minimum distance from the plot position based on the plot position;
    selecting the second sets of motion feature amounts from third sets of motion feature amounts extracted from respective combinations of basic motions corresponding to the predetermined higher-level behaviors; and
    mapping respective ranges in which the predetermined higher-level behaviors are observed, on the feature amount space defined by the second sets of motion feature amounts.

7. The non-transitory computer-readable recording medium according to claim 6, wherein
    the selecting includes selecting, as the second sets of motion feature amounts, motion feature amounts capable of distinguishing between the predetermined higher-level behaviors, from the third sets of motion feature amounts in accordance with a predetermined feature amount selection algorithm.

8. The non-transitory computer-readable recording medium according to claim 6, wherein
    the respective ranges are set based on maximum values and minimum values of the second sets of motion feature amounts obtained in a section where the predetermined higher-level behaviors are observed on the feature amount space in predetermined reference images.

9. The non-transitory computer-readable recording medium according to claim 6, wherein
    each of the mapping areas is defined by a coordinate of a vertex forming a boundary line of each of the mapping areas.

10. The non-transitory computer-readable recording medium according to claim 9, wherein
    the executing includes expanding an area defined by the coordinate of the vertex located at the minimum distance in Manhattan distance from the plot position.

11. An information processing apparatus, comprising:
    a memory; and
    a processor coupled to the memory and the processor configured to:
    extract skeleton information including a plurality of joint positions for each frame of an image;
    calculate a first set of motion feature amounts from the skeleton information;
    calculate a plot position by plotting the first set of motion feature amounts on a feature amount space defined by a second set of motion feature amounts, the plot position being a position where the first set of motion feature amounts is plotted on the feature amount space, the feature amount space having a plurality of mapping areas in which respective ranges corresponding to predetermined higher-level behaviors to be recognized are mapped;
    execute, when a degree of divergence from a minimum distance to other distances among distances between the plot position and each of the plurality of mapping areas satisfies a predetermined criterion, an update of expanding a mapping area at the minimum distance from the plot position based on the plot position;
    select the second sets of motion feature amounts from third sets of motion feature amounts extracted from respective combinations of basic motions corresponding to the predetermined higher-level behaviors; and
    map respective ranges in which the predetermined higher-level behaviors are observed, on the feature amount space defined by the second sets of motion feature amounts.

12. The information processing apparatus according to claim 11, wherein
    the processor is further configured to:
    select, as the second sets of motion feature amounts, motion feature amounts capable of distinguishing between the predetermined higher-level behaviors, from the third sets of motion feature amounts in accordance with a predetermined feature amount selection algorithm.

13. The information processing apparatus according to claim 11, wherein
    the respective ranges are set based on maximum values and minimum values of the second sets of motion feature amounts obtained in a section where the predetermined higher-level behaviors are observed on the feature amount space in predetermined reference images.

14. The information processing apparatus according to claim 11, wherein
    each of the mapping areas is defined by a coordinate of a vertex forming a boundary line of each of the mapping areas.

15. The information processing apparatus according to claim 14, wherein
    the processor is further configured to:
    expand, to execute the update, an area defined by the coordinate of the vertex located at the minimum distance in Manhattan distance from the plot position.

* * * * *